No. 807,912. PATENTED DEC. 19, 1905.
H. DESRUMAUX.
APPARATUS FOR PURIFYING FOUL WATER.
APPLICATION FILED FEB. 3, 1905.
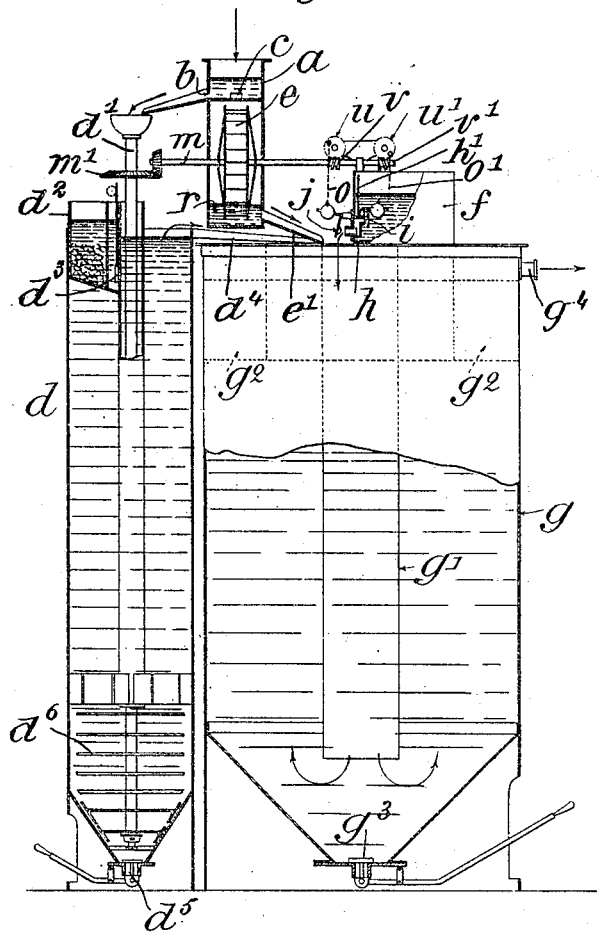
WITNESSES:
W. M. Avery
A. E. Fay
INVENTOR
Henri Desrumaux
BY
ATTORNEYS

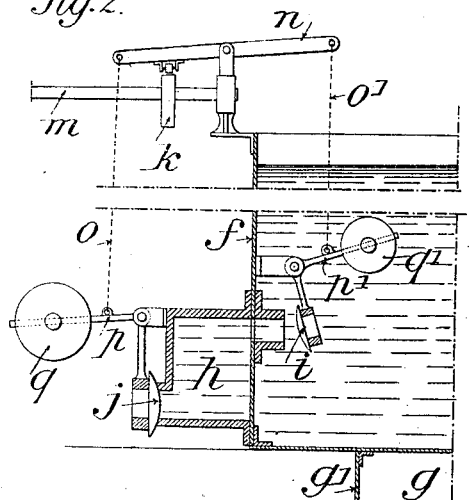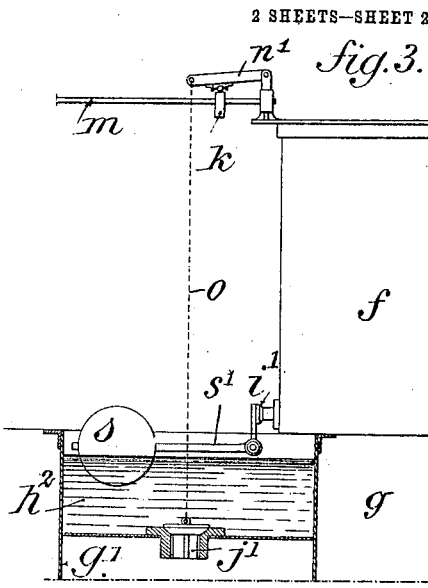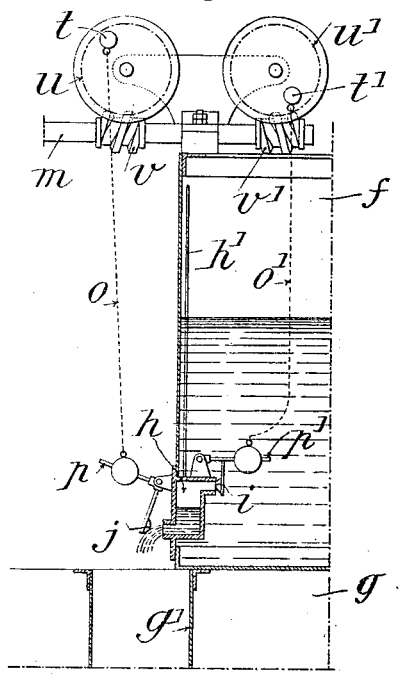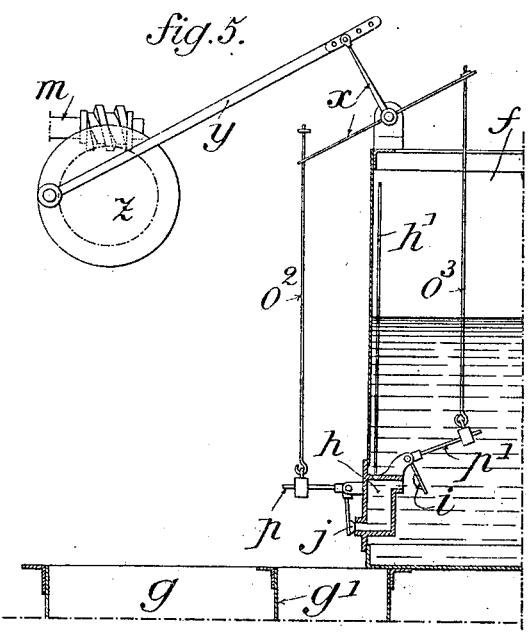

UNITED STATES PATENT OFFICE.

HENRI DESRUMAUX, OF PARIS, FRANCE.

APPARATUS FOR PURIFYING FOUL WATER.

No. 807,912.     Specification of Letters Patent.     Patented Dec. 19, 1905.

Application filed February 3, 1905. Serial No. 244,004.

*To all whom it may concern:*

Be it known that I, HENRI DESRUMAUX, engineer, a citizen of the Republic of France, residing at 35 Rue Alphonse de Neuville, Paris, in the Republic of France, have invented certain new and useful Improvements in Apparatus for Purifying Foul Water, of which the following is a specification.

This invention relates to a purifying apparatus in which the mixture of the foul water with the reagents is produced with exactness and is quickly and completely decanted.

It comprises in particular a device for distributing the solutions of reagents, which is very simple in construction and very reliable in its operation and which gives at the same time an exact proportionality between the quantities of water and the solutions of reagents.

Other features of this invention will appear below.

In the accompanying drawings, which show four forms in which this invention may be carried out, Figure 1 is an elevation of a purifying plant constructed in accordance with the principle of my invention and showing one form of device for distributing a reagent. Fig. 2 is a vertical section showing a modified form. Fig. 3 is a vertical section of another modified form. Fig. 4 is a vertical section, on an enlarged scale, of a part of the apparatus shown in Fig. 1; and Fig. 5 is a similar vertical section of another modification.

In Fig. 1, $a$ designates a water-distributing tank into which the foul water to be purified can flow in irregular quantities. Through two orifices $b$ and $c$, made at the same level in the tank, both having the same height but a different width, the foul water flows, on the one hand, into a receptacle $d$ for saturating with lime and, on the other hand, into a water-wheel $e$. The water is conducted to the bottom of the receptacle $d$ by a rotatable tube $d'$. The receptacle is provided with a lime-holder $d^2$, having a regulating-gate $d^3$. It also has a valve $d^5$ for cleaning.

$f$ designates a tank of liquid reagent.

The water, saturated with lime, coming from the receptacle $d$ through a spout $d^4$, the water flowing out of the wheel $e$ through a spout $e'$, and the reagent coming from the tank $f$ in a manner to be described are assembled in the well-known manner in a mixing, reacting, and decanting tank $g$. The said reservoir is not provided with surfaces of deposit like the decanting-reservoirs of the apparatuses now in use. To make decantation safe in the said reservoir, it is given a predetermined height and a predetermined passage-section in order that the mixture in passing upward through the reservoir shall sojourn in the same during a period of time at least equal to that of the chemical reactions, or about two hours and a half, and that the upward push of the current on the solid particles of the mixture shall be inferior to the action of gravity on the said particles.

The mixture fed into the bottom of the reservoir through a tube is decanted as it rises, and then it passes into a filter $g^2$, located at the top of the reservoir, and of which the filtering matter is composed of wood fiber or of broken flint.

A valve $g^3$, located at the bottom of the reservoir $g$, allows of the deposit being taken out. An overflow $g^4$ is provided.

The tank $f$ is provided with a distributing device comprising a small mixing-compartment $h$, both fixed and closed, provided with an inlet-valve $i$ and an outlet-valve $j$, (see Fig. 2,) which are actuated alternately by means of a cam $k$, fixed to the shaft $m$ of the wheel $e$ through the medium of a double-armed lever $n$, the ends of which are connected by chains $o$ $o'$ with weighted levers $p$ $p'$ and the balance-weights $q$ $q'$ of the two valves. The balance-weight of the valve $j$ is heavy enough to overcome the action of the other balance-weight and to cause the opening of the valve $i$ when the valve $j$ is closed.

The wheel $e$ is provided with laterally-closed buckets and is subjected to a certain amount of resistance—for instance, to the resistance of the water into which the lower buckets dip at $r$—so that the wheel shall turn as a water-meter—that is to say, proportionally to the volume of water which flows.

At each revolution of the wheel $e$ the cam $k$ causes the alternative opening of the valves $i$ and $j$, which close afterward by the action of the balance-weights $q$ $q'$, so that the compartment is filled with reagent and is then emptied into a suitable pipe or directly into the mixing-tank. The lengths of the chains are such that the chain $o$ of the valve $j$ is still slack when the valve $i$ begins to touch its seat, so that the valve $j$ is not opened until after the valve $i$ is quite closed and that it closes before the valve $i$ is opened. An invariable portion of the reagent is therefore distributed for each revolution of the wheel $e$, and consequently for a determined volume of water, that being so whatever may be the height of the liquid in the tank $f$. On the other hand, at whatever moment the foul water may cease to flow into the purifying plant, as one of the valves at least is closed the outflow of the reagent solution is completely stopped.

In Fig. 1 is shown gearing $m'$ for rotating the tube $d'$ and agitators $d^6$.

In a device shown in Fig. 3 the valve $j''$ is the only one to be actuated mechanically by the shaft $m$ of the water-wheel $e$, the other valve $i'$ operating automatically under the action of a float $s$, mounted on a lever $s'$, located in the portioning-compartment $h^2$, which in this case may be open at the top. At each revolution of the cam $k$ the valve $j''$ is opened through the movements of a lever $n'$ and chain $o$, so that the compartment $h^2$ is soon emptied of its contents. In the interval of two openings of the valve $j''$ the compartment $h^2$ is filled up to a level which always remains the same on account of the automatic operation of the float-valve, the quantity given out by which is small when compared with that of the valve $j''$, whereby the quantity of reagent solution given out by the valve $j''$ is really proportional to the rotation of the wheel $e$, and consequently to the volume of foul water which flows. As, on the other hand, the proportion of the volumes of water passing through the orifices $b$ and $c$, placed at the same level, remains always the same, there is constantly obtained the same proportionality between the quantities of foul water, of lime-water, and of reagent solution in the mixing-reservoir $g$. Lastly, instead of controlling the valves or other obturators by cams and levers any other suitable mechanism may be used. For instance, the levers $p p'$ of the valves (see Figs. 1 and 4) may be connected by chains $o o'$ to studs $t t'$, adjustably fixed on two worm-wheels $u u'$, rotated by worms $v v'$, revolving with the water-meter or the driving-shaft $e$, or the same levers $p p'$ may be connected by rods $o^2 o^3$ (see Fig. 5) with a T-shaped rocking device $x$, which is put in motion by a rod $y$, connected with a wheel $z$, moved by the water-meter.

In Figs. 4 and 5, $h'$ designates a very narrow tube, which opens into the top of the compartment $h$ and into the top of the tank $f$ in order to allow the inflow of air into and the outflow air from the compartment $h$.

I claim—

1. In an apparatus for purifying foul water, the combination of a reservoir for the water to be purified having openings located at the same level and having the same height, a mixing-tank, a device for saturating water with lime located in position to receive water from one of said openings and to feed the mixing-tank, a wheel adapted to operate proportionally to the outflow of water from another of said openings, means for conducting water from the latter opening to the mixing-tank, a reagent-reservoir, a portioning-compartment connected with said reagent-reservoir, and means operable by said wheel for controlling the discharge of material from the reagent-reservoir.

2. In apparatus for purifying foul water, the combination of a reagent-reservoir, a compartment at the bottom of the said reservoir, an inlet and an outlet valve on the said compartment, a revolving shaft, two worms threaded in opposite directions on the said shaft, two worm-wheels meshing with the said worms, two crank-plates on the said wheels, and chains attached to the said plates to actuate the said valves respectively.

3. In an apparatus for purifying foul water the combination of a reservoir for the water to be purified, having two openings adapted to discharge the same amount of water, a mixing-tank, a device for saturating water with lime adapted to receive water from one of said openings and to feed the mixing-tank, a movable element operating proportionately to the outflow of water from the other of said openings, means for conducting water from said movable element to the mixing-tank, a reagent-reservoir, a compartment connected with said reagent-reservoir having inlet and outlet valves, a shaft connected with said movable element, and means on said shaft for operating said valves alternately, whereby liquid will pass through said compartment in proportion to the movement of said moving element.

In testimony that I claim the foregoing as my invention I have signed my name in presence of two subscribing witnesses.

HENRI DESRUMAUX.

Witnesses:
JOHN BAKER,
MAURICE ROUX.